United States Patent
Alsina et al.

(10) Patent No.: US 11,676,188 B2
(45) Date of Patent: Jun. 13, 2023

(54) METHODS OF AUTHENTICATING A USER

(71) Applicant: Apple Inc., Cupertino, CA (US)

(72) Inventors: Thomas Alsina, Mountain View, CA (US); Dallas B. De Atley, Cupertino, CA (US); Augustin J. Farrugia, Cupertino, CA (US); Byron B. Han, San Jsoe, CA (US); Sean B. Kelly, San Francisco, CA (US); Craig A. Marciniak, San Jose, CA (US); Maxim Khutornenko, San Jose, CA (US); Raymond N. Walsh, San Jose, CA (US)

(73) Assignee: Apple Inc., Cupertino, CA (US)

( * ) Notice: Subject to any disclaimer, the term of this patent is extended or adjusted under 35 U.S.C. 154(b) by 348 days.

(21) Appl. No.: 17/031,603

(22) Filed: Sep. 24, 2020

(65) Prior Publication Data
US 2021/0125248 A1      Apr. 29, 2021

Related U.S. Application Data

(63) Continuation of application No. 14/022,104, filed on Sep. 9, 2013, now abandoned.

(51) Int. Cl.
*G06Q 30/06*       (2023.01)
*G06F 21/32*       (2013.01)
(Continued)

(52) U.S. Cl.
CPC ......... *G06Q 30/0609* (2013.01); *G06F 21/32* (2013.01); *G06Q 20/04* (2013.01);
(Continued)

(58) Field of Classification Search
CPC .... G06Q 30/0609; G06Q 20/04; G06Q 20/12; G06Q 20/32; G06Q 20/322;
(Continued)

(56) References Cited

U.S. PATENT DOCUMENTS

| | | |
|---|---|---|
| 5,872,834 A | 2/1999 | Teitelbaum |
| 6,256,737 B1 | 7/2001 | Bianco et al. |
| | (Continued) | |

FOREIGN PATENT DOCUMENTS

| | | |
|---|---|---|
| CN | 1268234 | 9/2000 |
| CN | 1695163 | 11/2005 |
| | (Continued) | |

OTHER PUBLICATIONS

Kumar et al. ("Next Generation Electronic Passport Scheme using Cryptographic Authentication Protocols and Multiple Biometrics Technology", I.J. Information Engineering and Electronic Business, 2013, 2, pp. 34-43, Sep. 1, 2013) (Year: 2013).*

(Continued)

*Primary Examiner* — James D Nigh
(74) *Attorney, Agent, or Firm* — Brownstein Hyatt Farber Schreck, LLP

(57) ABSTRACT

An online store can transmit an online account token to an electronic device or to a biometric sensing device after a user successfully enters his or her account password. The electronic device or the biometric sensing device can countersign the online account token when the one or more biometric images match reference biometric images and the account password matches user identifier data stored in the electronic device or in the biometric sensing device. The countersigned online account token can then be transmitted to the online store. The user can then make one or more purchases after the online store receives the countersigned online account token.

20 Claims, 10 Drawing Sheets

(51) Int. Cl.
  *G06Q 20/04* (2012.01)
  *G06Q 20/12* (2012.01)
  *G06Q 20/32* (2012.01)
  *G06Q 20/36* (2012.01)
  *G06Q 20/38* (2012.01)
  *G06Q 20/40* (2012.01)
  *H04L 9/40* (2022.01)
  *G06Q 30/0601* (2023.01)

(52) U.S. Cl.
  CPC ............ *G06Q 20/12* (2013.01); *G06Q 20/32* (2013.01); *G06Q 20/322* (2013.01); *G06Q 20/3674* (2013.01); *G06Q 20/3821* (2013.01); *G06Q 20/40145* (2013.01); *H04L 63/083* (2013.01); *H04L 63/0861* (2013.01)

(58) Field of Classification Search
  CPC ........... G06Q 20/3674; G06Q 20/3821; G06Q 20/40145; G06F 21/32; H04L 63/083; H04L 63/0861
  USPC .......................................................... 705/75
  See application file for complete search history.

(56) References Cited

U.S. PATENT DOCUMENTS

| | | | |
|---|---|---|---|
| 6,400,836 B2 | 2/2002 | Senior | |
| 6,795,569 B1 | 9/2004 | Setlak | |
| 6,845,453 B2 | 1/2005 | Scheldt et al. | |
| 6,892,938 B2 | 5/2005 | Solomon | |
| 6,975,202 B1 | 12/2005 | Rodriguez et al. | |
| 7,039,805 B1 * | 5/2006 | Messing ................ | G06F 21/32 713/176 |
| 7,046,139 B2 | 5/2006 | Kuhn et al. | |
| 7,065,184 B2 | 6/2006 | Vishik et al. | |
| 7,110,987 B2 | 9/2006 | Engelhart | |
| 7,220,755 B2 | 4/2007 | Hamid et al. | |
| 7,210,620 B2 | 5/2007 | Jones | |
| 7,246,244 B2 | 7/2007 | Nanavati et al. | |
| 7,269,737 B2 | 9/2007 | Robinson | |
| 7,278,025 B2 | 10/2007 | Saito et al. | |
| 7,373,671 B2 | 5/2008 | Gudorf | |
| 7,502,761 B2 | 3/2009 | Siegal et al. | |
| 7,567,909 B1 * | 7/2009 | Billingsley ............ | G06Q 20/10 705/317 |
| 7,617,399 B2 | 11/2009 | Ebata | |
| 7,640,336 B1 | 12/2009 | Lu | |
| 7,769,845 B2 | 8/2010 | Baron | |
| 7,809,954 B2 | 10/2010 | Miller et al. | |
| 7,849,013 B2 | 12/2010 | Engelhart | |
| 7,855,899 B2 | 12/2010 | Yang | |
| 7,864,987 B2 | 1/2011 | Venkatanna et al. | |
| 7,865,439 B2 | 1/2011 | Siefert et al. | |
| 7,885,899 B1 | 2/2011 | Sancho | |
| 7,941,664 B2 * | 5/2011 | Wheeler ............... | G06Q 20/341 726/28 |
| 7,949,571 B2 | 5/2011 | Fujimaki | |
| 7,953,671 B2 | 5/2011 | Bishop et al. | |
| 7,980,378 B2 | 7/2011 | Jones et al. | |
| 8,028,896 B2 | 10/2011 | Carter et al. | |
| 8,060,413 B2 | 11/2011 | Castell et al. | |
| 8,063,889 B2 | 11/2011 | Anderson et al. | |
| 8,064,658 B2 | 11/2011 | Iannone | |
| 8,065,190 B2 | 11/2011 | Collas | |
| 8,072,060 B2 | 12/2011 | Chou | |
| 8,145,916 B2 | 3/2012 | Boshra et al. | |
| 8,171,531 B2 | 5/2012 | Buer | |
| 8,185,646 B2 | 5/2012 | Headley | |
| 8,190,908 B2 | 5/2012 | Jazayeri et al. | |
| 8,219,495 B2 | 7/2012 | Niwa | |
| 8,230,232 B2 | 7/2012 | Ahmed et al. | |
| 8,320,638 B2 | 11/2012 | Pitt et al. | |
| 8,336,096 B2 | 12/2012 | Narusawa et al. | |
| 8,345,931 B2 | 1/2013 | Jeronimus | |
| 8,346,953 B1 | 1/2013 | Hew | |
| 8,369,845 B2 | 2/2013 | Zou et al. | |
| 8,406,736 B2 | 3/2013 | Das et al. | |
| 8,429,760 B2 | 4/2013 | Tribble | |
| 8,473,748 B2 | 6/2013 | Sampas | |
| 8,483,659 B2 | 7/2013 | Mahajan et al. | |
| 8,548,166 B2 | 10/2013 | Wasilewski et al. | |
| 8,566,955 B2 | 10/2013 | Brosnan et al. | |
| 8,572,707 B2 | 10/2013 | Tuchman et al. | |
| 8,621,561 B2 | 12/2013 | Cross et al. | |
| 8,621,642 B2 | 12/2013 | Bjorn et al. | |
| 8,627,417 B2 | 1/2014 | Aoyama | |
| 8,627,454 B2 | 1/2014 | Bolyukh | |
| 8,635,165 B2 | 1/2014 | Beenau | |
| 8,660,322 B2 | 2/2014 | Tsai et al. | |
| 8,682,798 B2 | 3/2014 | Patterson | |
| 8,745,490 B2 | 6/2014 | Kim | |
| 8,745,716 B2 | 6/2014 | Brudnicki | |
| 8,762,276 B2 | 6/2014 | Lepisto et al. | |
| 8,799,670 B2 | 8/2014 | Naccache | |
| 8,839,371 B2 | 9/2014 | Ghosh | |
| 8,905,303 B1 | 12/2014 | Ben Ayed | |
| 8,943,326 B2 | 1/2015 | Tamkhane et al. | |
| 8,943,580 B2 | 1/2015 | Fadell et al. | |
| 8,966,076 B2 | 2/2015 | Kawana et al. | |
| 8,994,498 B2 | 3/2015 | Agrafioti et al. | |
| 9,015,796 B1 | 4/2015 | Fujioka | |
| 9,037,869 B2 | 5/2015 | Avancha et al. | |
| 9,076,027 B2 | 7/2015 | Miura et al. | |
| 9,098,510 B2 | 8/2015 | Seryakov et al. | |
| 9,119,067 B2 | 8/2015 | Santamaria et al. | |
| 9,203,845 B2 | 12/2015 | Webber | |
| 9,208,337 B2 | 12/2015 | Tayloe | |
| 9,294,550 B2 | 3/2016 | Song et al. | |
| 9,390,251 B2 | 7/2016 | Avancha et al. | |
| 9,411,037 B2 | 8/2016 | Jamtgaard et al. | |
| 9,443,097 B2 | 9/2016 | O'Hare et al. | |
| 9,576,135 B1 | 2/2017 | Komandoor | |
| 9,633,098 B2 | 4/2017 | Aissi et al. | |
| 9,665,785 B2 | 5/2017 | Han et al. | |
| 9,699,168 B2 | 7/2017 | Pieczul et al. | |
| 9,710,630 B2 | 7/2017 | Kim et al. | |
| 9,721,086 B2 | 8/2017 | Shear et al. | |
| 9,723,482 B2 | 8/2017 | Wang et al. | |
| 9,819,676 B2 | 11/2017 | Han et al. | |
| 9,832,189 B2 | 11/2017 | Han et al. | |
| 9,860,274 B2 | 1/2018 | Jacobs | |
| 9,935,942 B2 | 4/2018 | Kim et al. | |
| 9,959,539 B2 | 5/2018 | Han et al. | |
| 9,965,608 B2 | 5/2018 | Jang | |
| 10,044,700 B2 | 8/2018 | Gresham et al. | |
| 10,212,158 B2 | 2/2019 | Han et al. | |
| 10,303,884 B2 * | 5/2019 | Liu ....................... | H04L 9/3247 |
| 10,331,866 B2 | 6/2019 | Meir et al. | |
| 10,359,870 B2 | 7/2019 | Colley et al. | |
| 10,373,241 B2 | 8/2019 | Khalsa | |
| 10,735,412 B2 | 8/2020 | Alsina et al. | |
| 10,949,844 B2 | 3/2021 | Dryer et al. | |
| 2002/0018585 A1 | 2/2002 | Kim | |
| 2002/0056043 A1 | 5/2002 | Glass | |
| 2002/0073416 A1 | 6/2002 | Ramsey Catan | |
| 2002/0095586 A1 | 7/2002 | Doyle et al. | |
| 2002/0174345 A1 | 11/2002 | Patel | |
| 2003/0040339 A1 | 2/2003 | Chang | |
| 2003/0046237 A1 | 3/2003 | Uberti | |
| 2003/0061111 A1 | 3/2003 | Dutta et al. | |
| 2003/0156740 A1 | 8/2003 | Siegel et al. | |
| 2004/0044627 A1 | 3/2004 | Russell et al. | |
| 2005/0116026 A1 | 6/2005 | Burger et al. | |
| 2005/0154920 A1 | 7/2005 | Tartaglia et al. | |
| 2005/0229006 A1 | 10/2005 | deMoura et al. | |
| 2006/0064391 A1 | 3/2006 | Petrov et al. | |
| 2006/0101026 A1 * | 5/2006 | Fukushima ............... | H04L 9/40 |
| 2006/0173793 A1 | 8/2006 | Glass | |
| 2006/0202797 A1 | 9/2006 | Theis et al. | |
| 2006/0204048 A1 | 9/2006 | Morrison et al. | |
| 2006/0234764 A1 | 10/2006 | Gamo et al. | |
| 2006/0293892 A1 | 12/2006 | Pathuel | |
| 2007/0078908 A1 | 4/2007 | Rohatgi | |

(56) References Cited

U.S. PATENT DOCUMENTS

| | | | |
|---|---|---|---|
| 2007/0088950 A1* | 4/2007 | Wheeler | G06Q 20/0855 |
| | | | 713/170 |
| 2007/0118891 A1* | 5/2007 | Buer | G06F 21/445 |
| | | | 726/8 |
| 2007/0267478 A1 | 11/2007 | Turek et al. | |
| 2008/0016371 A1 | 1/2008 | Jiang et al. | |
| 2008/0097925 A1 | 4/2008 | King | |
| 2008/0103984 A1 | 5/2008 | Choe et al. | |
| 2008/0140569 A1 | 6/2008 | Handel | |
| 2008/0148393 A1 | 6/2008 | Wendt | |
| 2008/0267464 A1 | 10/2008 | Goda | |
| 2009/0240622 A1 | 9/2009 | Zandonadi | |
| 2009/0315674 A1* | 12/2009 | Otake | G06F 21/608 |
| | | | 340/5.82 |
| 2010/0005509 A1 | 1/2010 | Peckover | |
| 2010/0099383 A1 | 4/2010 | Yamagishi | |
| 2010/0218012 A1 | 8/2010 | Joseph et al. | |
| 2010/0241571 A1 | 9/2010 | McDonald | |
| 2010/0321197 A1 | 12/2010 | Wong et al. | |
| 2011/0035768 A1 | 2/2011 | Ling | |
| 2011/0082791 A1 | 4/2011 | Baghdasaryan et al. | |
| 2011/0119479 A1 | 5/2011 | Cowie et al. | |
| 2011/0138450 A1 | 6/2011 | Kesanupalli et al. | |
| 2011/0166922 A1 | 7/2011 | Fuerstenberg | |
| 2011/0238476 A1 | 9/2011 | Carr et al. | |
| 2011/0291798 A1 | 12/2011 | Schibuk | |
| 2011/0300829 A1 | 12/2011 | Nurmi et al. | |
| 2012/0123841 A1 | 5/2012 | Taveau et al. | |
| 2012/0237908 A1 | 9/2012 | Fitzgerald et al. | |
| 2012/0330769 A1 | 12/2012 | Arceo | |
| 2012/0330784 A1 | 12/2012 | Nahidipour | |
| 2012/0331566 A1 | 12/2012 | Lection et al. | |
| 2013/0067545 A1 | 3/2013 | Hanes | |
| 2013/0124416 A1 | 5/2013 | Pawar et al. | |
| 2013/0159699 A1 | 6/2013 | Torkkel | |
| 2013/0246800 A1 | 9/2013 | Stewart | |
| 2013/0254906 A1 | 9/2013 | Kessler et al. | |
| 2013/0298224 A1 | 11/2013 | Heilpern | |
| 2013/0332575 A1* | 12/2013 | Song | H04L 67/1097 |
| | | | 709/219 |
| 2014/0006795 A1 | 1/2014 | Han et al. | |
| 2014/0007223 A1 | 1/2014 | Han et al. | |
| 2014/0129843 A1 | 5/2014 | Shi et al. | |
| 2014/0136419 A1 | 5/2014 | Kiyohara | |
| 2014/0189807 A1 | 7/2014 | Cahill et al. | |
| 2014/0279497 A1 | 9/2014 | Qaim-Maqami | |
| 2014/0279498 A1 | 9/2014 | Qaim-Maqami | |
| 2014/0279516 A1 | 9/2014 | Rellas et al. | |
| 2014/0347479 A1 | 11/2014 | Givon | |
| 2015/0026056 A1 | 1/2015 | Calman | |
| 2015/0073998 A1 | 3/2015 | Alsina et al. | |
| 2015/0081552 A1 | 3/2015 | Stewart | |
| 2015/0186892 A1 | 7/2015 | Zhang et al. | |
| 2015/0199687 A1 | 7/2015 | Han et al. | |
| 2015/0220931 A1 | 8/2015 | Alsina et al. | |
| 2015/0294382 A1 | 10/2015 | Alsina et al. | |
| 2015/0304323 A1 | 10/2015 | Alsina et al. | |
| 2017/0364918 A1 | 12/2017 | Malhotra et al. | |
| 2018/0041506 A1 | 2/2018 | Han et al. | |
| 2018/0082065 A1* | 3/2018 | Liu | H04L 9/3247 |

FOREIGN PATENT DOCUMENTS

| | | |
|---|---|---|
| CN | 1783052 | 6/2006 |
| CN | 1983336 | 6/2007 |
| CN | 101075282 | 11/2007 |
| CN | 101256700 | 9/2008 |
| CN | 101261679 | 9/2008 |
| CN | 101827148 | 9/2010 |
| CN | 101933051 | 12/2010 |
| CN | 102088353 | 6/2011 |
| CN | 102609837 | 7/2012 |
| CN | 102867250 | 1/2013 |
| CN | 103037065 | 4/2013 |
| CN | 103220637 | 7/2013 |
| CN | 103221958 | 7/2013 |
| CN | 103268550 | 8/2013 |
| CN | 103269273 | 8/2013 |
| CN | 103295129 | 9/2013 |
| DE | 202005003042 | 11/2006 |
| DE | 102009027682 | 1/2011 |
| DE | 102012202731 | 8/2013 |
| EP | 1857954 | 11/2007 |
| EP | 2226741 | 9/2010 |
| EP | 2114051 | 6/2012 |
| EP | 2533172 A1 | 12/2012 |
| EP | 2597585 | 5/2013 |
| GB | 2447752 | 9/2008 |
| JP | A 2010140174 | 6/2010 |
| JP | A 2010193110 | 9/2010 |
| JP | A 2011192288 | 9/2011 |
| KR | 1020120122181 | 11/2012 |
| TW | I236634 | 7/2005 |
| TW | 200901724 | 1/2009 |
| TW | 200919255 | 5/2009 |
| TW | 201319817 | 5/2013 |
| WO | WO 03/062969 | 7/2003 |
| WO | WO 08/004312 | 1/2008 |
| WO | WO 08/030184 | 3/2008 |
| WO | WO 13/095434 | 6/2013 |

OTHER PUBLICATIONS

Yang et al. (Consent Biometrics, IEEE, Jul. 4, 2011, 6 pages) (Year: 2011).*

"Countersign." Merriam-Webster.com Dictionary, Merriam-Webster, https://www.merriam-webster.com/dictionary/countersign. Accessed Oct. 28, 2022 (Year: 2022).*

Countersign definition, dictionary.com Unabridged Based on the Random House Unabridged Dictionary, © Random House, Inc. 2022 (Year: 2022).*

(Definition of countersign from the Cambridge Advanced Learner's Dictionary & Thesaurus © Cambridge University Press) (Year: 2022).*

Definition of countersign, Oxford University Press (Year: 2022).*

Pot, "What is Apple's Secure Enclave, And How Does It Protect My iPhone or Mac?" How-to-Geek, Oct. 23, 2018, https://www.howtogeek.com/339705/what-is-apples-secure-enclave-and-how-does-it-protect-my-iphone-or-mac/, 5 pages.

Islam et al., "A Biometrics-Based Secure Architecture for Mobile Computing," systems, Applications and Technology Conference (LISAT), 2012 IEEE Long Island, May 4, 2012, pp. 1-5, XP032192493, Section III: Proposed Architecture.

Paterson et al., "Efficient Identity-based Signatures Secure in the Standard Model," *Information Security Group*, Royal Holloway, University of London, Egham, Surrey, ACISP'06 Proceedings of the 11th Australasian Conference on Information Security and Privacy, Melbourne, Australia, Jul. 3-5, 2006, 17 pages.

Schwartz, "Apple Hackers Rate iPhone5s Security," Informationweek—Online, Monmouth Junction, Sep. 13, 2013, 3 pages.

Soap Web Service Development, Snell, China Electric Power Press, Sep. 2002, pp. 76-81.

Spencer et al., "iCaughtU Pro review [iPhone]," Publisher: knowyourmobile.com, Dec. 13, 2011, pp. 1-3.

* cited by examiner

METHODS OF AUTHENTICATING A USER

CROSS-REFERENCE TO RELATED APPLICATION

This application is a continuation of U.S. patent application Ser. No. 14/022,104, filed Sep. 9, 2013, and entitled "Use of a Biometric Image in Online Commerce," the contents of which are incorporated herein by reference as if fully disclosed herein.

TECHNICAL FIELD

The present invention relates to electronic devices, and more particularly to a biometric sensing device included in, or connected to an electronic device. Still more particularly, the present invention relates to the use of one or more biometric data in online commerce.

BACKGROUND

Passwords are a common security tool for applications, websites, and devices. A user-entered password must match a reference password before the user is given access or allowed to interact with an application, website, or device. But passwords can have a number of limitations. The number of characters that can be included in the password can be limited to a maximum number, such as eight or twelve characters. Additionally, a user can be prohibited from using certain types of characters in their password. For example, a password may not include symbols such as a pound or hash symbol (#), an exclamation sign (!), and a percent sign (%). Randomly generated passwords can be more secure than passwords that are selected by a user, but randomly generated passwords can be difficult to remember. Some users therefore prefer to select passwords that are easier to remember at the expense of security. For example, a password that includes a complete word, the user's birthday, or a company name may be easier to remember, but such passwords can also be easier to guess or discover.

The use of biometric data can provide a greater level of security to a device or application compared to passwords. Biometric data can also be easier to enter compared to passwords, especially randomly generated passwords and long passwords. Biometric sensing devices can detect or image a unique physical or behavioral trait of a person and produce biometric data that can reliably identify the person. For example, a fingerprint includes a unique pattern of veins, ridges and valleys that can be imaged by a fingerprint sensor. The image of the fingerprint, or the unique characteristics of the fingerprint, is compared to previously captured reference data, such as a reference fingerprint image. The identity of the person is obtained or verified when the newly captured fingerprint image matches the reference fingerprint image.

SUMMARY

Embodiments described herein provide methods for authenticating a user with one or more biometric images and permitting the user to purchase from an online store using a biometric image or images. The terms "image" and "biometric image" are meant to encompass an image, a composite image, and other types of data that can be captured by a biometric sensing device. In one aspect, a method for completing a purchase on an online store can include a processing device determining if a biometric image matches a reference biometric image. If the biometric image matches the reference biometric image, the processing device can countersign an online account token that is associated with an account of the user on the online store with user identifier data. The countersigned online account token indicates the purchase on the online store can be completed. The countersigned token can then be transmitted to the online store, where the user is permitted to make one or more purchases on the online store based on the countersigned online account token.

In another aspect, a system can include a processing device, a biometric sensing device operatively connected to the processing device, and one or more memories operatively connected to the processing device. An online account token and user identifier data can be stored in the memory or memories. The processing device can be configured to countersign the online account token with at least some of the user identifier data when a biometric image captured by the biometric sensing device matches a reference biometric image.

In another aspect, a network communications interface can be operatively connected to the processing device. The processing device can then transmit the countersigned online account token to the online store using a network connection established with the network communications interface.

In yet another aspect, a method for authenticating a user having an account on an online store can include the online store transmitting an online account token associated with the account to an electronic device, and the online store receiving a countersigned online account token from the electronic device. The countersigned online account token can indicate the identity of the user has been authenticated based on a biometric image and can indicate the biometric image is associated with the account.

BRIEF DESCRIPTION OF THE DRAWINGS

Embodiments of the invention are better understood with reference to the following drawings. The elements of the drawings are not necessarily to scale relative to each other. Identical reference numerals have been used, where possible, to designate identical features that are common to the figures.

DETAILED DESCRIPTION

Embodiments described herein permit a user to make purchases on an online store using one or more biometric images. The online store can transmit an online account token to an electronic device and/or to a biometric sensing device after the user successfully enters his or her account password. The electronic device or the biometric sensing device can countersign the online account token when the one or more biometric images match respective reference biometric images and the account password matches user identifier data stored in the electronic device or in the biometric sensing device. The countersigned online account token can then be transmitted to the online store. The user can make one or more purchases after the online store receives the countersigned online account token.

Any suitable type of biometric sensing device can be included in, or connected to an electronic device. A person's fingerprint, eye, DNA, vein patterns, typing speed or patterns, gait, voice, face, and heart or brain signals are examples of a physical characteristic or a behavioral trait that can be detected or imaged by a biometric sensing device. A biometric sensing device can employ capacitance, ultrasonic, optical, resistive, thermal, or other sensing technologies to detect or image a biometric attribute. The term "biometric attribute" is meant to encompass a physical or behavioral trait that can be detected by a biometric sensing device.

Directional terminology, such as "top", "bottom", "front", "back", "leading", "trailing", etc., is used with reference to the orientation of the Figure(s) being described. Because components of embodiments described herein can be positioned in a number of different orientations, the directional terminology is used for purposes of illustration only and is in no way limiting. When used in conjunction with layers of a display or device, the directional terminology is intended to be construed broadly, and therefore should not be interpreted to preclude the presence of one or more intervening layers or other intervening features or elements. Thus, a given layer that is described as being formed, positioned, disposed on or over another layer, or that is described as being formed, positioned, disposed below or under another layer may be separated from the latter layer by one or more additional layers or elements.

Figure 1:
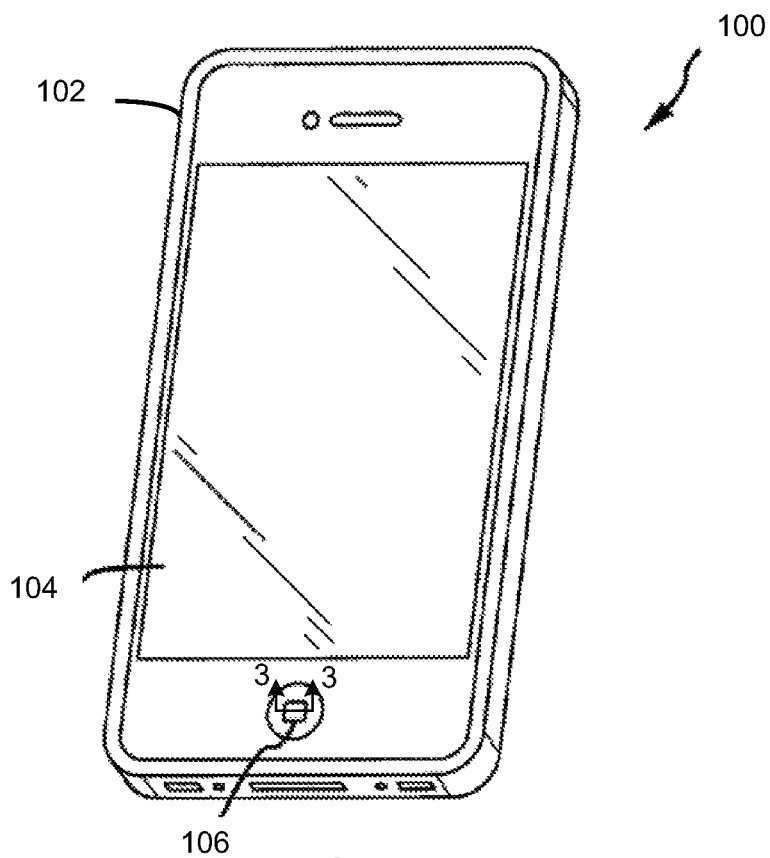
FIG. 1 is a perspective view of one example of an electronic device that can include, or be connected to a biometric sensing device.

Referring now to FIG. 1, there is shown a perspective view of one example of an electronic device that can include, or be connected to a biometric sensing device. In the illustrated embodiment, the electronic device 100 is implemented as a smart telephone. Other embodiments can implement the electronic device differently, such as, for example, as a laptop or desktop computer, a tablet computing device, a gaming device, a display, a digital music player, a wearable computing device or display, and other types of electronic devices that can acquire and/or receive biometric data from a biometric sensing device.

The electronic device 100 includes an enclosure 102 at least partially surrounding a display 104 and one or more buttons 106 or input devices. The enclosure 102 can form an outer surface or partial outer surface and protective case for the internal components of the electronic device 100, and may at least partially surround the display 104. The enclosure 102 can be formed of one or more components operably connected together, such as a front piece and a back piece. Alternatively, the enclosure 102 can be formed of a single piece operably connected to the display 104.

The display 104 can be implemented with any suitable technology, including, but not limited to, a multi-touch sensing touchscreen that uses liquid crystal display (LCD) technology, light emitting diode (LED) technology, organic light-emitting display (OLED) technology, organic electroluminescence (OEL) technology, or another type of display technology. The button 106 can take the form of a home button, which may be a mechanical button, a soft button (e.g., a button that does not physically move but still accepts inputs), an icon or image on a display, and so on. Further, in some embodiments, the button 106 can be integrated as part of a cover glass of the electronic device.

One or more biometric sensing devices can be included in, or connected to the electronic device 100. In one embodiment, the button 106 can include a biometric sensing device. As one example, a fingerprint sensor can be integrated in the button. Additionally or alternatively, a biometric sensing device can be included in a portion of the display, or in the entire display. And in some embodiments, the enclosure 102 can include one or more biometric sensing devices, such as a fingerprint sensor, a thermal sensor, and a microphone that can be used in conjunction with a voice recognition application.

Figure 2:
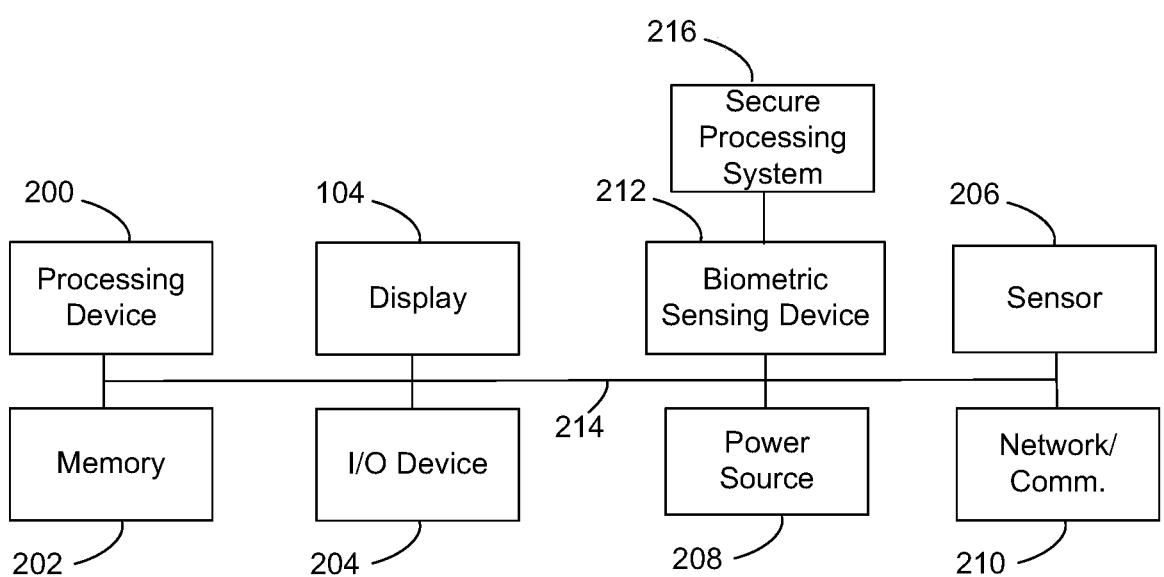
FIG. 2 is an illustrative block diagram of the electronic device 100 shown in FIG. 1.

FIG. 2 is an illustrative block diagram of the electronic device 100 shown in FIG. 1. The electronic device 100 can include the display 104, a processing device 200, memory 202, an input/output (I/O) device 204, a sensor 206, a power source 208, a network communications interface 210, and a biometric sensing device 212. The display 104 may provide an image or video output for the electronic device 100. The display may also provide an input region for one or more input devices, such as, for example, a touch sensing device and/or a fingerprint sensor. The display 104 may be substantially any size and may be positioned substantially anywhere on the electronic device 100.

The processing device 200 can control some or all of the operations of the electronic device 100. The processing device 200 can communicate, either directly or indirectly, with substantially all of the components of the electronic device 100. For example, a system bus or signal line 214 or other communication mechanisms can provide communication between the processing device 200, the memory 202, the I/O device 204, the sensor 206, the power source 208, the network communications interface 210, and/or the biometric sensing device 212. The processing device 200 can be implemented as any electronic device capable of processing, receiving, or transmitting data or instructions. For example, the processing device 200 can be a microprocessor, a central processing unit (CPU), an application-specific integrated circuit (ASIC), a digital signal processor (DSP), or combinations of such devices. As described herein, the term "processing device" is meant to encompass a single processor or processing unit, multiple processors, multiple processing units, or other suitably configured computing element or elements.

The memory 202 can store electronic data that can be used by the electronic device 100. For example, a memory can store electrical data or content such as, for example, audio and video files, documents and applications, device settings and user preferences, timing signals, biometric images, data structures or databases, and so on. The memory 202 can be configured as any type of memory. By way of example only, the memory can be implemented as random access memory, read-only memory, Flash memory, removable memory, or other types of storage elements, or combinations of such devices.

The I/O device 204 can transmit and/or receive data to and from a user or another electronic device. One example of an I/O device is button 106 in FIG. 1. The I/O device(s) 204 can include a display, a touch sensing input surface such as a trackpad, one or more buttons, one or more microphones or speakers, one or more ports such as a microphone port, and/or a keyboard.

The electronic device 100 may also include one or more sensors 206 positioned substantially anywhere on the electronic device 100. The sensor or sensors 206 may be configured to sense substantially any type of characteristic, such as but not limited to, images, pressure, light, touch, heat, movement, relative motion, biometric data, and so on. For example, the sensor(s) 206 may be an image sensor, a heat sensor, a light or optical sensor, an accelerometer, a pressure transducer, a gyroscope, a magnet, a health monitoring sensor, and so on.

The power source 208 can be implemented with any device capable of providing energy to the electronic device 100. For example, the power source 208 can be one or more batteries or rechargeable batteries, or a connection cable that connects the remote control device to another power source such as a wall outlet.

The network communication interface 210 can facilitate transmission of data to or from other electronic devices. For example, a network communication interface can transmit electronic signals via a wireless and/or wired network connection. Examples of wireless and wired network connections include, but are not limited to, cellular, Wi-Fi, Bluetooth, IR, and Ethernet.

The biometric sensing device 212 can be implemented as any suitable biometric sensor, scanner, and/or system. For example, the biometric sensing device can be a facial recognition device, an iris or retina scanner, a vein recognition device that can image the veins in a finger or palm, a facial biometrics scanner, and/or a thermal imaging scanner. Additionally, the biometric sensing device 212 can be implemented with any suitable sensing technology, including, but not limited to, capacitive, resistive, ultrasound, piezoelectric, and thermal sensing technology.

The biometric sensing device 212 can be connected to a secure processing system 216. The secure processing system can be included in the electronic device or in the biometric sensing device. The secure processing system 216 can receive biometric images captured by the biometric sensing device. The secure processing system 216 is generally used to store and manipulate secure data, including the biometric images, reference biometric images, and user identifier data associated with a user and his or her online account for an online store. The processing device 200 can be prohibited from accessing the secure data and the biometric images received from the biometric sensing device, which increases the security of the data and biometric images. For example, the secure data and biometric images are inaccessible or less accessible to other programs that may be running on the processing device 200.

In one embodiment, the secure processing system can include one or more secure processors, a secure persistent memory, and a secure non-persistent memory. Any suitable processing device and memory can be used in the secure processing system 216. Other components can be included in the secure processing system in some embodiments. Additionally or alternatively, a secure processing system can include only one memory. The secure processing system 216 is described in more detail in conjunction with FIGS. 5 and 7.

In embodiments described herein, the biometric sensing device can be one or more fingerprint sensors. A fingerprint sensor can capture images of one or more fingers, a portion of one or more fingers, and/or some or all of a palm or of a hand. In some embodiments, the fingerprint sensor is positioned at a location that a user's finger, fingers and/or hands are naturally in contact with as the user interacts with the electronic device. For example, as described earlier, an electronic device can include a fingerprint sensor in the display 104, the button 106, the enclosure 102, and/or as a separate electronic device that is connected to the electronic device 100.

As used herein, the terms "image" and "biometric image" includes an image, a composite image formed with multiple images, and other types of data that can be captured by a biometric sensing device. The term "fingerprint image" includes an image, a composite image, and other types of data that can be captured by a fingerprint sensor. By way of example only, a fingerprint sensor can produce a data structure that defines the features in a fingerprint. Additionally, the term "fingerprint image" is meant to encompass an image or other data relating to a fingerprint of some or all of one or more fingers, some or all of a palm, some or all of a hand, and various combinations thereof. The term "finger" is meant to encompass one or more fingers, some or all of a palm, some or all of a hand, and various combinations thereof.

It should be noted that FIGS. 1 and 2 are illustrative only. In other examples, an electronic device may include fewer or more components than those shown in FIGS. 1 and 2.

Figure 3:
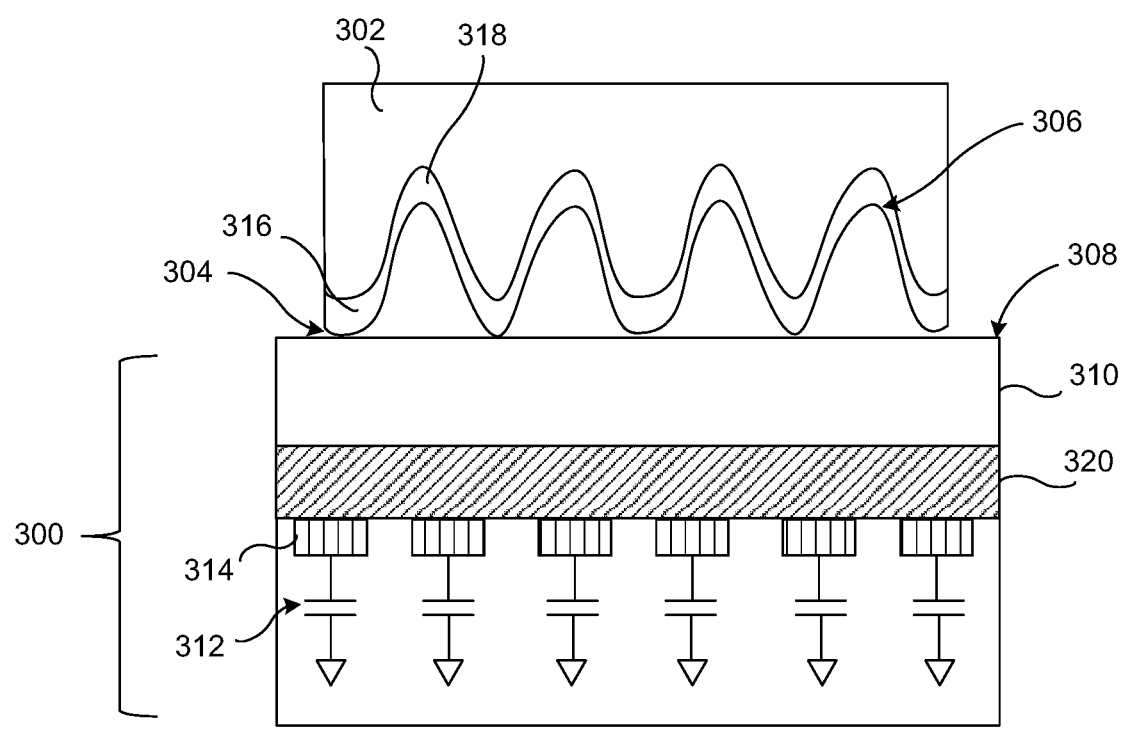
FIG. 3 depicts an enlarged and simplified cross-sectional view of a portion of a fingerprint sensor taken along line 3-3 in FIG. 1.

An example construction of a capacitive fingerprint sensor and how the capacitive fingerprint sensor captures a fingerprint will now be briefly described. FIG. 3 illustrates an enlarged and simplified cross-sectional view of a portion of a fingerprint sensor taken along line 3-3 in FIG. 1. A first layer 310 can be disposed over a dielectric layer 320. By way of example only, the first layer 310 can be a dielectric layer such as an exterior surface of a button or other input device (e.g., button 106 in FIG. 1), an exterior surface of an input device such as a trackpad or mouse, and/or a cover glass of a display (e.g., display 104 in FIG. 1). In some embodiments, the dielectric layer 320 can be a color layer that can be used to reduce the visibility of the electrodes and other circuitry of the fingerprint sensor.

The capacitive fingerprint sensor 300 can capture a fingerprint image of at least a portion of the finger 302 by measuring capacitance differences between the finger 302 and the electrodes 314. A fingerprint is generally formed from ridges 304 and valleys 306 arranged in a unique pattern. Typically, the capacitance measured between a ridge 304 and one or more electrodes 314 varies from the capacitance measured between a valley 306 and one or more electrodes 314. The measured capacitance between a ridge and an electrode can be greater than the measured capacitance between a valley and an electrode because the ridge is closer to the electrode. The differences in the measured capacitances can be used to distinguish between ridges and valleys and produce a fingerprint image.

The skin on the finger 302 includes a dead skin layer 316 disposed over a live skin layer 318. The capacitive fingerprint sensor 300 typically images the dead skin layer 316 to obtain an image of the fingerprint. However, if a portion of the dead skin layer 316 is damaged or missing, the capacitive fingerprint sensor can obtain an image of the fingerprint by imaging the live skin layer 318 by itself, or by imaging both the remaining dead skin layer 316 and the exposed live skin layer 318.

In some embodiments, a user can determine a level of security when accessing the online store with an electronic device. For example, a user can require that a sequence of fingerprints be captured and matched to a sequence of reference fingerprint images before the user can access and/or make purchases on the online store. The user can specify the number of fingerprints in the sequence, which fingerprints are included in the sequence, and/or the order of the fingerprints in the sequence. For example, a user can require that two fingerprints be captured and the fingerprints to be scanned along with the order of the scans are the right index finger and the left ring finger.

Additionally, a user can require a password be entered and matched to a reference password. Access or purchases on the online store is allowed only when a fingerprint or a sequence of fingerprints matches respective reference fingerprint images and only after the password matches the reference password.

Figure 4:
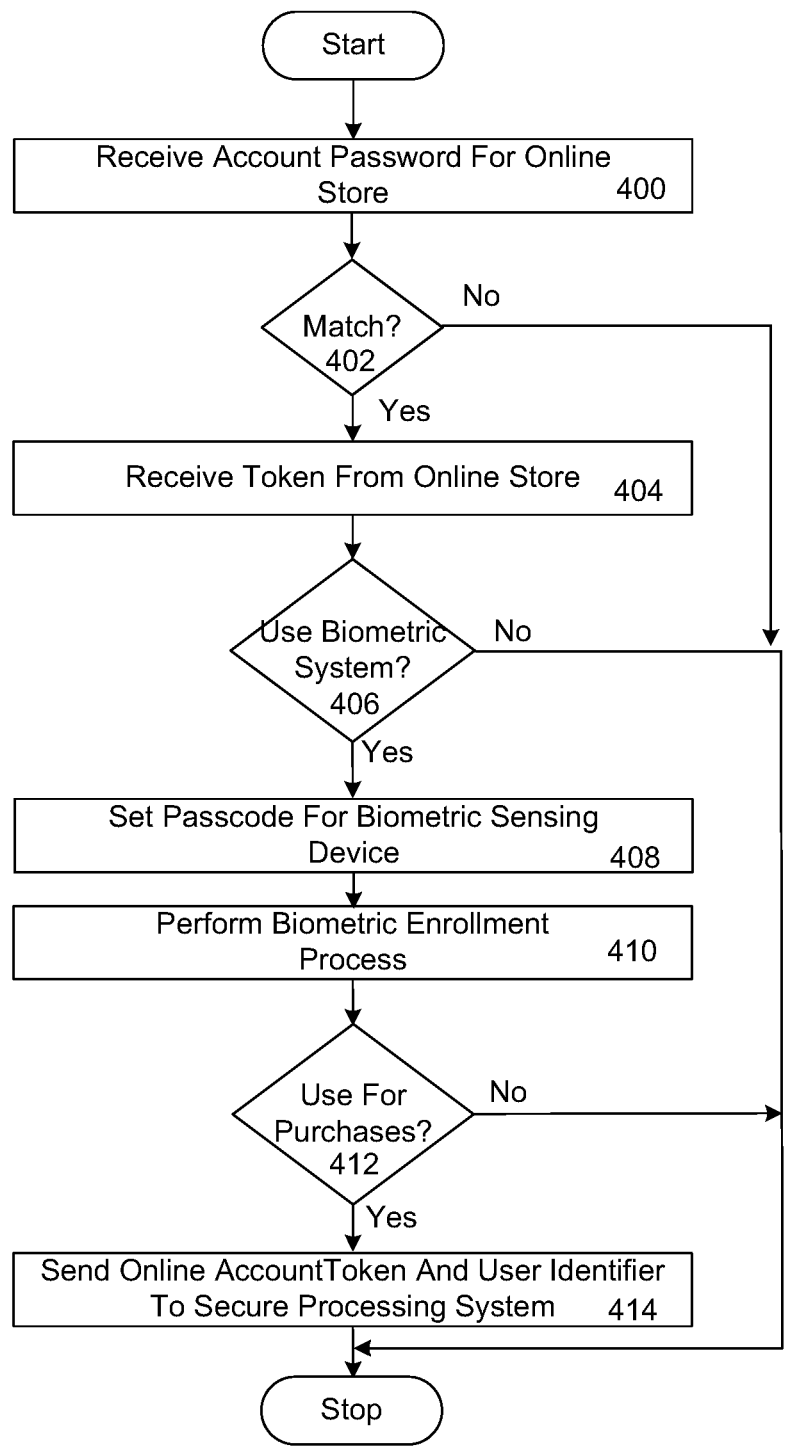
FIG. 4 is a flowchart of a method for setting up a biometric sensing device for use in online commerce.
Figure 5:
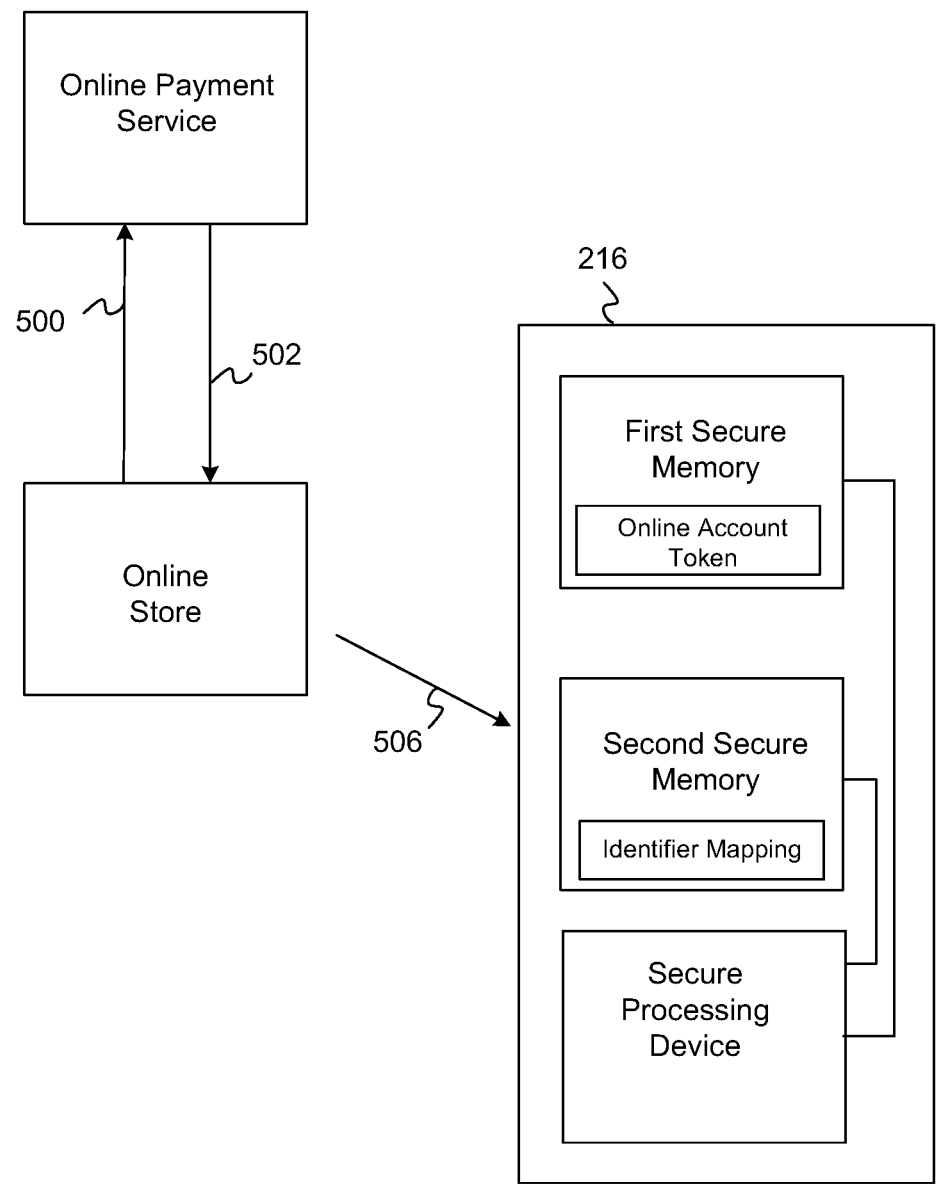
FIG. 5 is a data flow diagram of the method shown in FIG. 4.

Referring now to FIG. 4, there is shown a flowchart of a method for setting up a biometric sensing device for use in online commerce. FIG. 5 is a data flow diagram of the method shown in FIG. 4. The method shown in FIG. 4 is described with reference to a single biometric image, but those skilled in the art will recognize that other embodiments can use one or more biometric images. As described previously, a sequence of biometric images can be used to make purchases in an online store.

Initially, an account password is received at block 400. In one embodiment, the account password can be entered by a user on an electronic device operatively connected to an online store. The account password can be associated with the online store. The account password can be entered through a dialog box in a user interface. In one embodiment, the account password can be transmitted by the online store to an online payment service that matches the account password to an account in the online store (see step 500 in FIG. 5). A determination can then be made at block 402 as to whether the entered account password matches the password associated with the online account. If not, the method ends.

When the entered account password matches the account password, the process continues at block 404 where an online account token can be received from the online payment service (step 502 in FIG. 5). A determination can then be made at block 406 as to whether the biometric sensing device is to be used with the online store. As one example, a user can be prompted to approve or reject the use of the biometric sensing device with a dialog box or menu. The method ends if the user does not want to use the biometric sensing device.

When the biometric sensing device is to be used, the method continues at block 408 where a user can set a passcode for the biometric sensing device. A biometric enrollment process can then be performed on the electronic device at block 410. Generally, an enrollment process can include capturing one or more biometric images of a biometric attribute and storing at least one biometric image in memory. At least one of the entered biometric images can then be used as a reference biometric image. The term "biometric attribute" is meant to encompass a physical or behavioral trait that can be detected by a biometric sensing device. As one example, when the biometric sensing device is a fingerprint sensor, a fingerprint image can be acquired and stored in memory during an enrollment process.

A determination can then be made at block 412 as to whether or not the biometric sensing device is to be used for purchases from the online store. As one example, a user can be prompted to approve or reject the use of the biometric sensing device with a dialog box or menu. The method ends if the biometric sensing device will not be used to make purchases on the online store.

When the biometric sensing device will be used to make purchases, the process passes to block 414 where the online account token and user identifier data are transmitted to a secure processing system (e.g., 216 in FIG. 2) in the electronic device (step 506 in FIG. 5). In one embodiment, the user identifier data can associate or map the passcode for the biometric sensing device to the online store account. The user identifier data can include the passcode set at block 408, a universally unique identifier (UUID) associated with the biometric sensing device, and a directory services identification (DSID) that represents the user's account on the online store. In some embodiments, a hash of the DSID is included in the user identifier data instead of the DSID. Other types of user identifier data can be used in other embodiments.

In some embodiments, a secure processing system 216 can include a non-persistent secure memory and a persistent secure memory. The online account token can be transmitted to the secure processing system 216 and stored in the non-persistent secure memory. Thus, the online account token may be cleared automatically from the non-persistent secure memory each time the non-persistent memory loses power, such as when the electronic device is turned off. The user identifier data can be transmitted to the secure processing system 216 and stored in the persistent secure memory.

Figure 6:
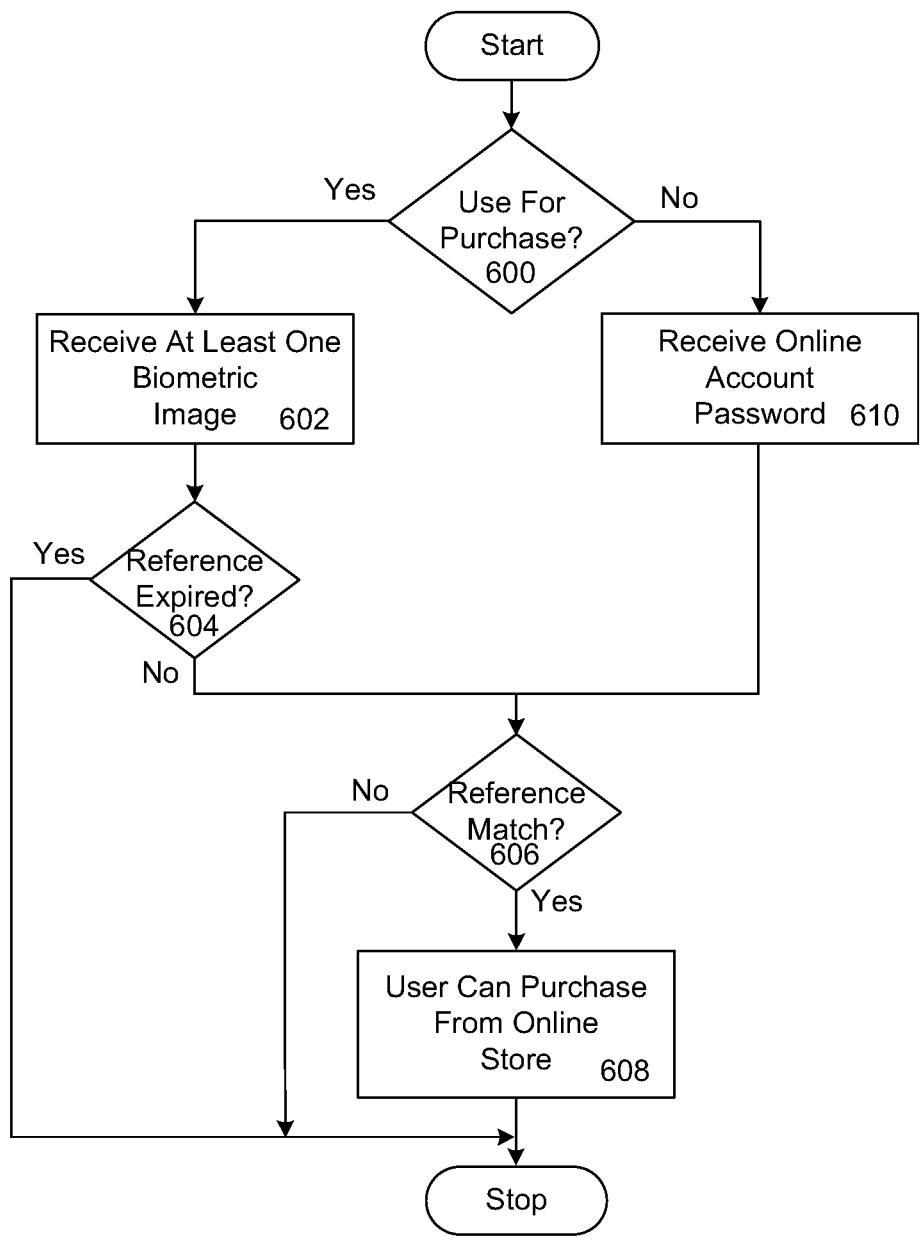
FIG. 6 is a flowchart of a method for purchasing from an online store.
Figure 7:
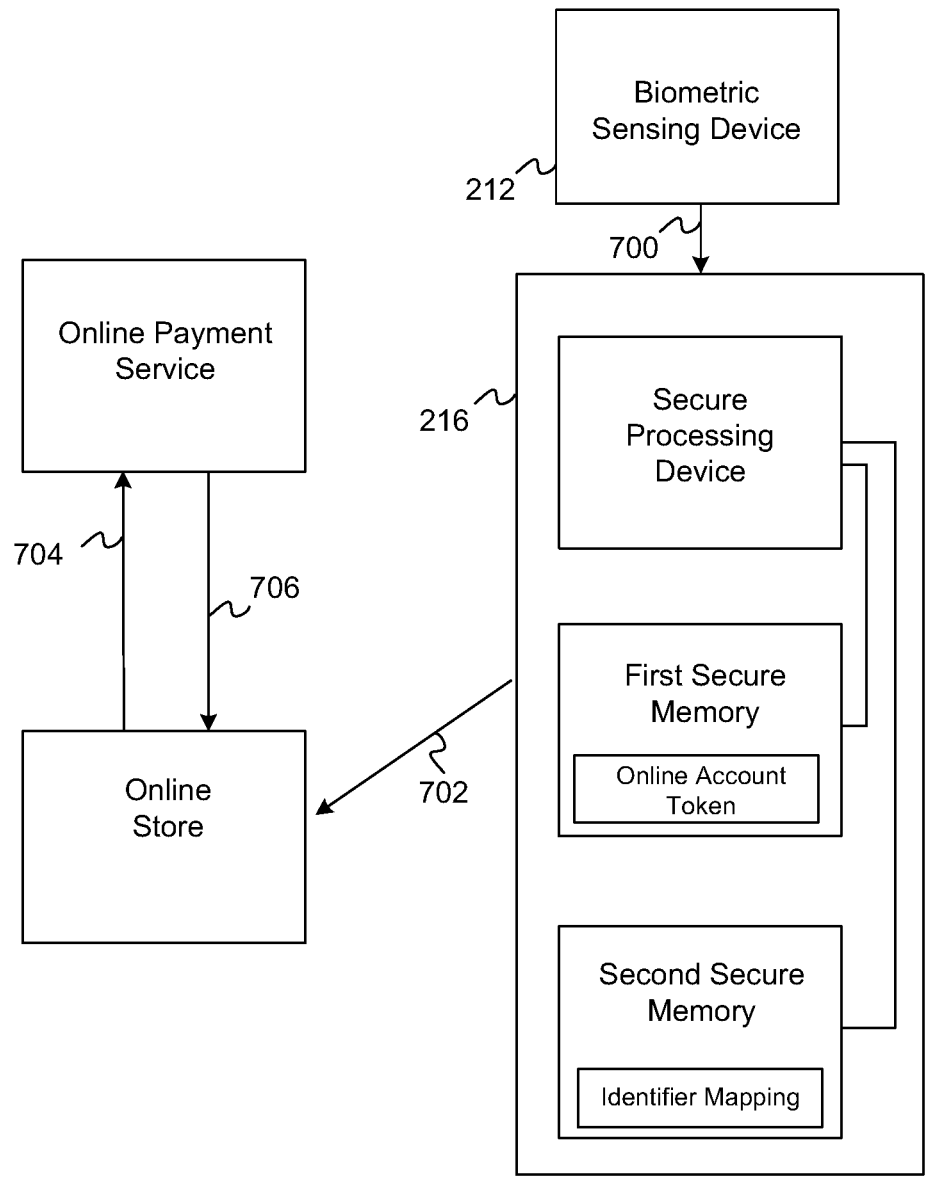
FIG. 7 is a data flow diagram of the method shown in FIG. 6.

Referring now to FIG. 6, there is shown a flowchart of a method for purchasing from an online store. FIG. 7 is a data flow diagram of the method shown in FIG. 6. The method shown in FIG. 6 is described with reference to a single biometric image, but those skilled in the art will recognize that other embodiments can use one or more biometric images. As described previously, a sequence of biometric images can be used to make purchases in an online store.

Initially, as shown in block 600, a determination can be made as to whether the biometric sensing device is to be used to complete a purchase from the online store. If so, the process continues at block 602 where a biometric image can be captured and transmitted to a secure processing system (step 700 in FIG. 7). A determination can then be made at block 604 as to whether the reference biometric image has expired. The method ends if the reference biometric image has expired.

In some embodiments, a user can set an expiration date for his or her reference biometric image. The user can allow the reference biometric image or images to be used only for a set period of time. After the reference biometric image expires, a user can perform another enrollment process to create another reference biometric image. Additionally or alternatively, an online store can require a reference biometric image to expire after a given amount of time. For example, the online store may require reference biometric images to expire as part of a fraud prevention program.

When the reference biometric image has not expired, the method passes to block 606 where a determination is made as to whether the biometric image received at block 602 matches the reference biometric image. The method ends if the biometric image does not match the reference image. When the biometric image matches the reference image, the process continues at block 608 where a user can complete the purchase on the online store.

In one embodiment, a purchase can be completed by having a processing device, such as a secure processing device, countersign the online account token stored in the first secure memory with the hash of the DSID and transmit the countersigned online account token to the online store (step 702 in FIG. 7). The countersigned online account token can indicate the biometric image matched the reference biometric image. The countersigned online account token can indicate the user is permitted to make one or more purchases on the online store and/or the purchase can be completed. The online store can then transmit the countersigned online account token to the online payment service (step 704). The online payment service can verify the online account token is countersigned, complete payment for the purchase, and then transmit a purchase confirmation notification to the online store (step 706). The processing device can countersign and transmit the online account token immediately after the biometric image matches the reference biometric image. Alternatively, the online account token can be countersigned in advance but not transmitted to the online store until after the biometric image matches the reference biometric image.

In some embodiments, a window of time can be set in which a user can make purchases repeatedly without having to reenter a biometric image. The online account token can include a timestamp that indicates a start time for the window. As one example, when the biometric image matches the reference biometric image at block 606, a fifteen minute window can be created where a user can make multiple purchases. The window can then close after fifteen minutes and the user will have to re-enter his or her biometric image to complete any other purchases.

Figure 8:
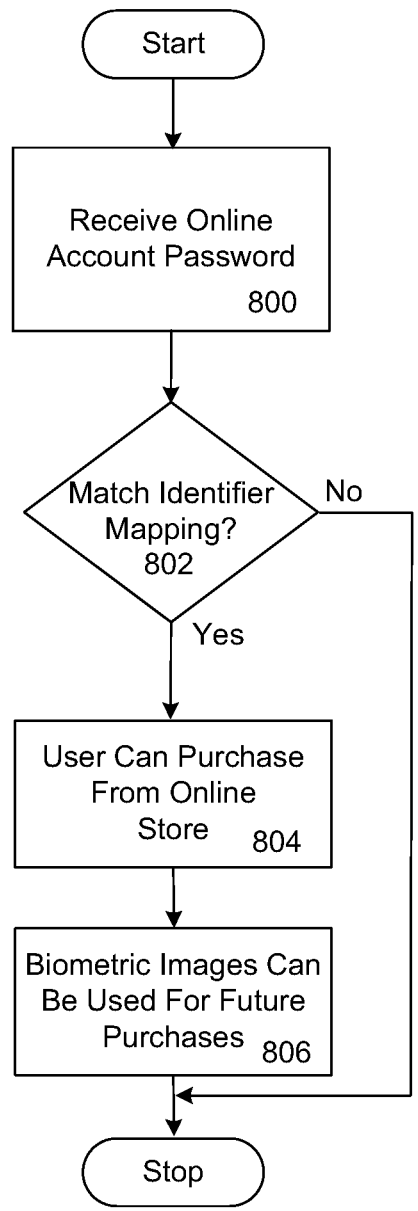
FIG. 8 is a flowchart of a method for purchasing from an online store on an electronic device with an account established after the method of FIG. 4 has been performed on the electronic device.

Referring now to FIG. 8, there is shown a flowchart of a method for purchasing from an online store on an electronic device with an established account after the method of FIG. 4 is performed on the electronic device. In this embodiment, a user can enter an online account password to complete a first purchase after performing the embodiment shown in FIG. 4, and thereafter use a biometric image to complete future purchases. Initially, a user enters his or her online account password at block 800 and a determination is made as to whether the online account password matches the user identifier data stored in a memory (block 802), such as the second secured memory shown in FIG. 5. The method ends when the account password does not match the user identifier data.

When the online account password matches the user identifier data, the process continues at block 804 where user is now able to make purchases on the online store. A purchase can be completed using the steps 702, 704, 706 described in conjunction with FIG. 7. Next, as shown in block 806, the online account is set up to permit purchases based on the receipt and matching of biometric images.

Figure 9:
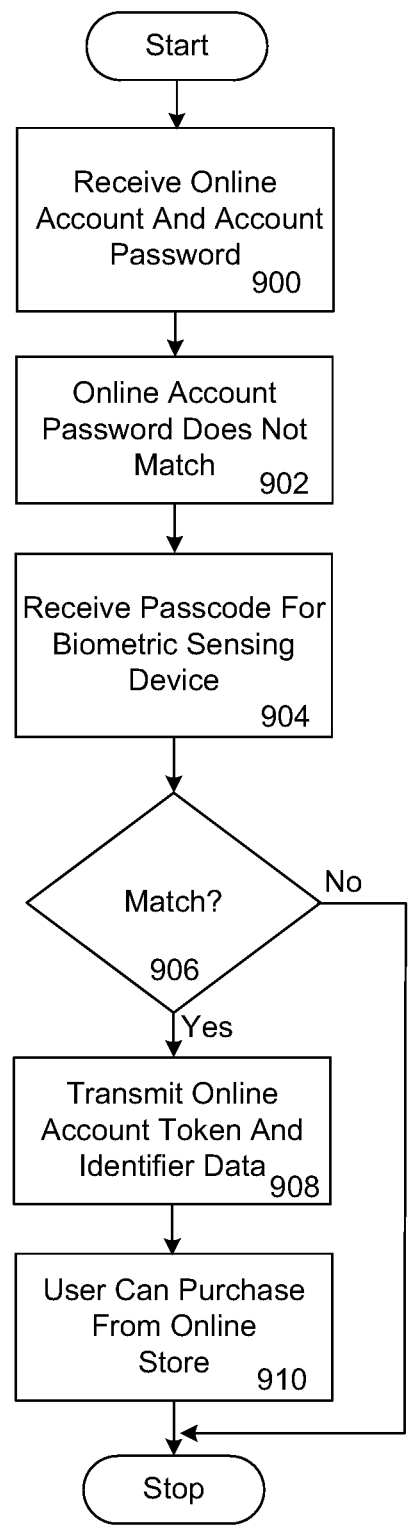
FIG. 9 is a flowchart of a method for purchasing from an online store on an electronic device with an unknown account after the method shown in FIG. 4 has been performed on the electronic device.

FIG. 9 is a flowchart of a method for purchasing from an online store on an electronic device with an unknown account after the method shown in FIG. 4 has been performed on the electronic device. Initially, a user enters his or her online account and account password at block 900. Since this account has not been set up to permit purchases based on biometric images, the online account does not match the user identifier data previously created (e.g., at block 414 in FIG. 4) (block 902). Next, as shown in blocks 904 and 906, a user can enter the passcode for the biometric sensing device and a determination may be made as to whether the entered passcode matches the previously created user identifier data. The method ends if the passcode does not match the user identifier data.

When the passcode matches the user identifier data, the process can continue at block 908 where the online account token and user identifier data can be transmitted to a processing system, such as the secure processing system 216 (step 506 in FIG. 5). In one embodiment, the biometric sensing device is mapped to the online store account using the matching passcode. Thus, the user identifier data can include the matching passcode, a universally unique identifier (UUID) associated with the biometric sensing device, and a directory services identification (DSID) that represents the user's account on the online store. As previously described, a hash of the DSID is included in the user identifier data instead of the DSID. The online account and electronic device are now set up to permit purchases based on the receipt and matching of biometric images (block 910), and the method ends.

Figure 10:
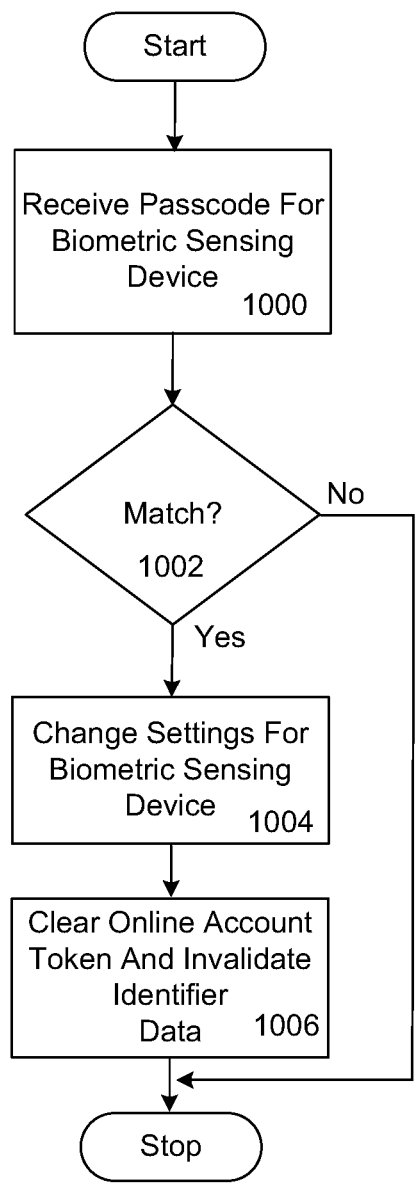
FIG. 10 is a flowchart of a method for changing one or more settings associated with a biometric sensing device.

Referring now to FIG. 10, there is shown a flowchart of a method for changing one or more settings associated with a biometric sensing device. Initially, the user enters the passcode for the biometric sensing device at block 1000. A determination can then be made at block 1002 as to whether the entered passcode matches the passcode in the user identifier data. The method ends if the passcode does not match the passcode in the user identifier data.

When the passcode matches the passcode in the user identifier data, the process continues at block 1004 where one or more settings for the biometric sensing device can be changed. For example, a user can add a biometric image of a new biometric attribute, such as an image of a new finger. Similarly, a user can delete a biometric image.

Next, as shown in block 1006, the online account token can be deleted from the secure processing system and the user identifier data invalidated. The method ends after block 1006. In some embodiments, a UUID is associated with each new biometric image. Thus the user identifier data may be invalidated because the UUID can change based on the modified setting or settings.

Figure 11:
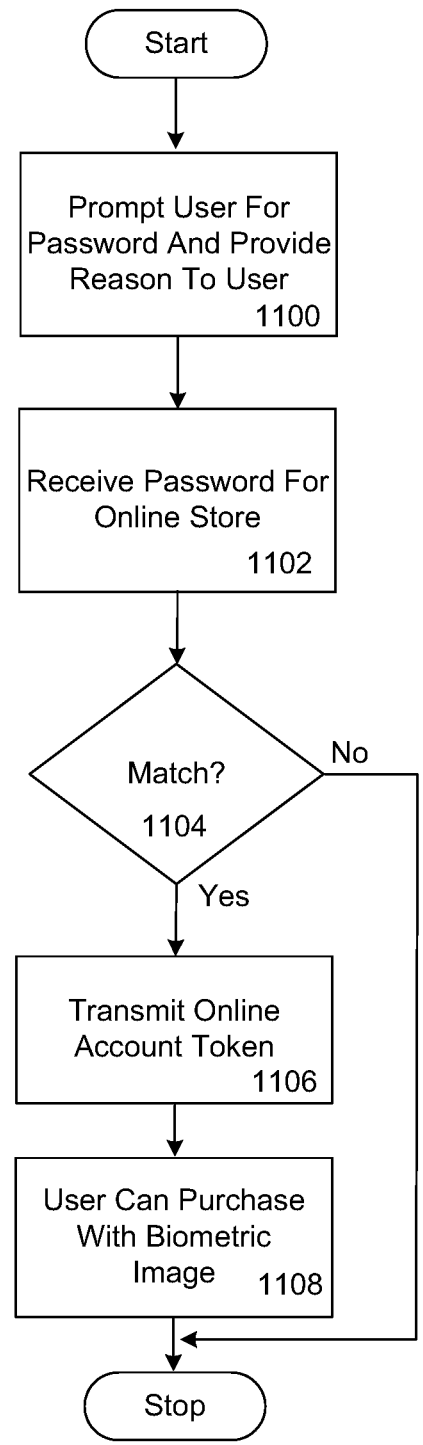
FIG. 11 is a flowchart of a method for purchasing from the online store after one or more settings for the biometric sensing device are changed.

FIG. 11 is a flowchart of a method for purchasing from the online store after one or more settings for the biometric sensing device are changed. In some embodiments, the method of FIG. 11 can also be performed after the biometric sensing device and/or the electronic device being used to access the online account is rebooted. Initially, a user can be prompted for his or her password and a reason as to why the password must be entered can be provided to the user (block 1100). As one example, the phrase "biometric sensing device settings were changed" can be displayed to the user. As another example, the phrase "biometric sensing device was rebooted" can be displayed to the user.

Next, as shown in block 1102, the user enters his or her online password for the online store. A determination can then be made at block 1104 as to whether the entered account password matches the password stored in the user identifier data (e.g., user identifier data stored in persistent secure memory). The method ends if the password does not match the user identifier data. When the entered account password matches the user identifier data, the process passes to block 1106 an online account token can be transmitted to a secure processing device. In some embodiments, the user identifier data does not have to be remapped because the same account password is associated with user identifier data. The user is now permitted to make purchases based on a biometric image (block 1108), and the method ends.

In some embodiments, the online account password can be deleted from the secure processing system when a user signs out of the online store or logs off the electronic device. The user identifier data, however, can still be stored in the secure processing system when the user identifier data is stored in a persistent memory.

Various embodiments have been described in detail with particular reference to certain features thereof, but it will be understood that variations and modifications can be effected within the spirit and scope of the disclosure. And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

What is claimed is:

1. A method for initiating a transaction with a website using an electronic device, comprising:
   receiving at the electronic device, from a user of the electronic device, a first user input;
   transmitting the first user input from the electronic device to the website;
   receiving from the website and at the electronic device, an online account token;
   receiving from the user, at the electronic device, a second user input;
   electronically associating the online account token with an indication that a purchase via the website can be completed by the user using the electronic device; and
   transmitting the online account token along with the associated indication, from the electronic device to the website, at least partly in response to receiving the second user input.

2. The method of claim 1, further comprising:
   receiving, from the website and at the electronic device, user identifier data; wherein,
   the user identifier data is the indication that the purchase via the website can be completed by the user using the electronic device.

3. The method of claim 1, wherein the first user input comprises a password.

4. The method of claim 1, wherein the second user input comprises an image of a face.

5. The method of claim 1, wherein the second user input comprises a biometric.

6. The method of claim 5, further comprising:
   matching the received biometric to a stored reference biometric; wherein,
   the online account token and the associated indication that the purchase via the website can be completed by the user using the electronic device are transmitted from the electronic device to the website after performing the matching.

7. The method of claim 5, further comprising:
   matching the received biometric to a stored reference biometric; wherein,
   the online account token is electronically associated with the indication that the purchase via the website can be completed by the user using the electronic device after performing the matching.

8. The method of claim 7, further comprising:
   receiving, from the website and at the electronic device, user identifier data; wherein,
   the user identifier data is the indication that the purchase via the website can be completed by the user using the electronic device.

9. The method of claim 1, wherein:
   the website comprises an online store; and
   the transaction comprises a purchase.

10. The method of claim 1, wherein:
    the online account token is received at the electronic device in response to the first user input matching user identifier data.

11. A method of making a purchase from an online store using an electronic device, comprising:
    receiving an account password via a user interface displayed to a user by the electronic device;
    transmitting the account password from the electronic device to the online store;
    receiving from the online store, at the electronic device and in response to the account password matching user identifier data, an online account token and at least a portion of the user identifier data;
    determining, by the electronic device, that a biometric sensing device of the electronic device is approved for use in completing a purchase from the online store;
    capturing a biometric, using the biometric sensing device, after determining the biometric sensing device is approved for use in completing the purchase;
    determining that the captured biometric matches a reference biometric;
    electronically associating the online account token with an indication that a purchase via the online store can be completed by the user using the electronic device;
    transmitting the online account token along with the associated indication, from the electronic device to the online store, after determining the captured biometric matches the reference biometric.

12. The method of claim 11, wherein the purchase is a first purchase and the captured biometric is a first biometric, the method further comprising:
    receiving user input initiating a second purchase from the online store;
    determining the first biometric is not expired; and
    authorizing the second purchase at least partly in response to determining the first biometric is not expired, and without receiving a second biometric from the user.

13. The method of claim 11, further comprising:
    determining the reference biometric is not expired before determining the captured biometric matches the reference biometric.

14. The method of claim 13, wherein determining the reference biometric is not expired comprises:
    determining a period of time associated with the reference biometric is not expired.

15. The method of claim 13, wherein determining the reference biometric is not expired comprises:
    determining a window of time associated with the online account token is not expired.

16. The method of claim 11, wherein:
    the user identifier data is the indication that the purchase via the online store can be completed by the user using the electronic device.

17. A method of enabling use of a biometric sensing device for purchases on an online store, comprising:
    receiving an account password via a user interface, the user interface displayed by an electronic device that includes the biometric sensing device;
    transmitting the account password from the electronic device to the online store;
    receiving from a user of the electronic device, at the electronic device, an approval to use the biometric sensing device for purchases on the online store;
    prompting the user via the user interface, at least partly in response to the approval to use the biometric sensing device, to provide a biometric;

storing the biometric in a memory of the electronic device as a reference biometric;

receiving from the online store and at the electronic device, in response to the approval to use the biometric sensing device for purchases on the online store, and in response to the account password matching user identifier data, an online account token and at least a portion of the user identifier data;

storing the at least portion of the user identifier data in a persistent memory of a secure processing system of the electronic device; and storing the online account token in a non-persistent memory of the secure processing system.

18. The method of claim 17, further comprising:

prompting the user, via the user interface, to approve or reject use of the biometric sensing device for purchases on the online store; wherein, the approval to use the biometric sensing device for purchases on the online store is received in response to the prompting the user to approve or reject use of the biometric sensing device for purchases on the online store.

19. The method of claim 17, wherein the biometric comprises an image of a face.

20. The method of claim 17, wherein the biometric comprises a fingerprint.

\* \* \* \* \*